United States Patent [19]

Nakanishi et al.

[11] Patent Number: 5,124,232
[45] Date of Patent: Jun. 23, 1992

[54] OPTICAL RECORDING MEDIUM

[75] Inventors: Toshiharu Nakanishi; Naoya Seo, both of Otsu; Gentaro Ohbayashi, Kusatsu; Osamu Watanabe, Kyoto, all of Japan

[73] Assignee: Toray Industries, Inc., Tokyo, Japan

[21] Appl. No.: 561,637

[22] Filed: Aug. 2, 1990

[30] Foreign Application Priority Data

Apr. 17, 1990 [JP] Japan .................. 2-101096

[51] Int. Cl.$^5$ ............................. G03C 1/72
[52] U.S. Cl. ................... 430/270; 430/271; 430/272; 430/273; 430/275; 430/495; 430/945; 346/135.1
[58] Field of Search ............ 346/135.1; 430/495, 430/945, 346, 290, 271, 272, 273, 275, 270

[56] References Cited

U.S. PATENT DOCUMENTS 4,889,746 12/1989 Utsumi et al. ............... 427/162
4,954,379 9/1990 Nishida et al. ............... 428/64

FOREIGN PATENT DOCUMENTS 61-152487 7/1986 Japan .
62-145547 6/1987 Japan .
64-89046 4/1989 Japan .

Primary Examiner—Lee C. Wright
Attorney, Agent, or Firm—Nikaido, Marmelstein, Murray & Oram

[57] ABSTRACT

An optical recording medium includes at least a substrate and a recording layer formed on the substrate, said recording layer being irradiated with an energy beam to change the optical properties thereof by directly or indirectly generated heat, thereby recording information, wherein said recording layer comprises four elements of tellurium (Te), germanium (Ge), gallium (Ga) and bismuth (Bi) and has a composition represented by the following formula:

$$(Te_xGe_{1-x})_{1-y}(Ga_zBi_{1-z})_y$$

wherein
$0.40 \leq x \leq 0.75$
$0.02 \leq y \leq 0.30$ and
$0.05 \leq z \leq 0.50$, x is the molar fraction of Te in Te-Ge, y is the molar fraction of the total amount of Bi and Ga in the recording layer, and z is the molar fraction of Ga in Ga-Bi. The optical recording medium of the present invention exhibits excellent CNR and recording sensitivity, no significant noise, a large amplitude of read-out signal, no significant jitter fluctuation excellent capability for high-speed and high-density recording, excellent life of media and resistance to moisture-and-heat, and high reliability.

16 Claims, 2 Drawing Sheets

OPTICAL RECORDING MEDIUM

BACKGROUND OF THE INVENTION

1. Field of the Invention

The present invention relates to an optical recording medium. More particularly, the present invention relates to an optical recording medium for use in devices, such as an optical disk, optical card, optical tape and so forth, wherein information is recorded by irradiation of an energy beam such as a laser beam or an electron beam.

In particular, the present invention relates to an optical recording medium which enables information to be recorded at a high speed and a high density, has a high reliability and is excellent in the quality of read-out signals.

2. Description of the Prior Art

Various materials, such as In-Se alloy system, Te sub-oxide system, Sb-Te alloy system and Te-Ge alloy system thin films, have been proposed as an optical recording medium which takes advantage of the difference in optical properties accompanying the phase transition from crystalline state to amorphous state and vice versa. In this connection, one of the methods for evaluating an optical recording medium preferable from the viewpoint of compatibility with a drive system is that standards of the write once type and rewritable type recording media which are in the process of standardization by ISO (International Organization for Standardization) are used as a criterion for evaluating the performance of a recording medium and the performance is judged based on whether the media is well matched to the standards. However, for example, regarding the write once type recording medium, it is not easy to develop a medium material fulfilling the standards, i.e., having a good balance of characteristics in respect of a recording density, a carrier to noise ratio (hereinafter referred to as "CNR") representing a signal quality and a recording sensitivity as well as having excellent life of media.

For this reason, many studies have been made on an improvement in the characteristics of the recording layer of the above-described material system. In particular, a Te-Ge alloy material is advantageous in that the change of reflectance (signal margin) between before and after the phase transition is relatively large and well-known thin film forming techniques, such as vacuum evaporation and sputtering, can be utilized. Therefore, several ideas on an improvement in the characteristics through addition of various elements to the Te-Ge alloy to form three- or four-component alloy materials have been proposed.

Specifically, compositions comprising Te-Ge and Bi or $Bi_2Te_3$ are known as a three-component alloy system material (see Japanese Patent Application Kokai Publication Nos. 62-209741, 63-225935 and 1-165048), and Japanese Patent Application Kokai Publication No. 63-155442 discloses a composition comprising Te as a major component and Ge and Bi added thereto. Although in a recording media comprising the above-described compositions as a recording layer, a crystallized mark can be formed at a practical laser power, such recording media had drawbacks that no sufficient CNR can be obtained in a high-density recording and/or a high-speed recording and/or the transition temperature of crystallization is lowered in a composition having a high Bi content to bring about a lowering in the thermal stability.

Four-component alloy system recording layers are disclosed in Japanese Patent Application Kokai Publication Nos. 62-152786, 61-152487, 62-145547 and 64-89046.

The Japanese Patent Application Kokai Publication No. 62-152786 describes that all kinds of elements can be added to Te-Ge alloy and the compositions exhibit good properties. However, only addition of Ti and Co to Te-Ge alloy is disclosed in the working examples, and neither specific studies nor specific disclosure is made on practical recording characteristics such as CNR or media noise. Evaluation of the recording media disclosed in the Japanese Patent Application Kokai Publication No. 62-152786 according to the ISO standards had revealed that they are insufficient in the CNR under high-density recording conditions and/or bring about a lowering in the signal quality due to an increase in the noise, etc. Therefore, their characteristics are unsatisfactory from the practical point of view. Besides the above-described addition of Ti and/or Co described in the working examples, disclosure on other elements which may be added to Te-Ge is only that part of Ti, Co or Ge may be replaced with, e.g., halogen elements, alkali metal elements, Ti, Pb, Sb, Au, Sn, Bi, In and Ga.

In particular, this publication does not clearly disclose that Bi and Ga makes various practical characteristics of media such as CNR and/or noise characteristics better, not to mention useful and positive finding on the function and effect of a four-component alloy system having a limited composition. For example, recording films comprising Te-Ge and separately added thereto Bi and Ga have drawbacks such as difficulty of obtaining a sufficient CNR value in high-density recording and/or lowering in the reliability of recorded information due to a lowering in the transition temperature of crystallization. Therefore, these materials are not regarded as practical.

The Japanese Patent Application Kokai Publication No. 61-152487 proposes addition of Group III, IV and V elements on the periodic table having atomic number 31 or higher to Te-Ge alloy. The essential feature of this proposal resides in the addition of one of the above-described elements to Te-Ge alloy. Specifically, only one composition comprising Te-Ge and Sb added thereto is disclosed as a working example, reference is made to only the effect of addition of Bi or In, and this publication does not disclose an improvement in various practical properties of a recording medium, such as CNR or noise characteristics, through addition of Group III, IV and V elements, not to mention the function and effect of preparation of a four-component alloy system having a limited composition through simultaneous addition of Bi and Ga to Te-Ge alloy as with the above-described Japanese Patent Application Kokai Publication No. 62-152786.

The Japanese Patent Application Kokai Publication No. 62-145547 describes that small amounts of Te and Ge are added to a composition mainly composed of a Ga-Bi alloy. However, only a recording layer of In-Bi alloy is described in the working example. This working example refers to an improvement in the sensitivity through an increase in the optical absorbance by making use of a particular material, such as ZnS, as the protective layer, and this publication is silent on whether or not the recording layer per se can realize practical and excellent recording characteristics.

Finally, the Japanese Patent Application Kokai Publication No. 64-89046 discloses a recording layer prepared by adding Ge and Bi to an alloy mainly composed of Ga-Te alloy and describes that when the total amount of Ge and Bi exceeds 20%, the structure of Ga-Te alloy is damaged, so that desired properties cannot be attained. Further, the Japanese Patent Application Kokai Publication No. 64-89046 has a working example on addition of Bi to Ga-Te alloy but has no clear description on a four-component alloy system containing Ge as well, i.e., disclose neither useful nor positive finding on the function and effect of an alloy system comprising four elements of Te, Ge, Ga and Bi and having a limited composition.

Further, the compositions disclosed in the above-described Japanese Patent Application Kokai Publication Nos. 62-145547 and 64-89046 have drawbacks such as insufficient crystallization, lowering in the crystallization speed and/or lowering in the transition temperature as well as small amplitude of read-out signal and/or low CNR due to insufficient change of reflectance of media.

SUMMARY OF THE INVENTION

An object of the present invention is to provide optical recording media having excellent CNR and signal quality and which are less susceptible to occurrence of noise.

Another object of the present invention is to provide an optical recording media which exhibit a large read-out signal amplitude and which are less susceptible to a lowering in the amplitude even in high-density recording.

A further object of the present invention is to provide an optical recording media which exhibit a proper transition temperature of crystallization, excellent life of media and high reliability.

A further object of the present invention is to provide an optical recording media which exhibit excellent recording characteristics even under high-speed recording conditions and excellent recording sensitivity.

A further object of the present invention is to provide an optical recording media which is less susceptible to degradation of CNR when a write power is varied, and occurrence of jitter of read-out signal.

Specifically, the present invention relates to an optical recording medium comprising at least a substrate and a recording layer formed on the substrate, said recording layer being irradiated with an energy beam to change the optical properties thereof by directly or indirectly generated heat, thereby recording information, wherein said recording layer comprises four elements of tellurium (Te), germanium (Ge), gallium (Ga) and bismuth (Bi) and has a composition represented by the following formula:

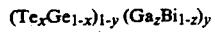

wherein
0.40≦x≦0.75,
0.02≦y≦0.30 and
0.05≦z≦0.50,
x is the molar fraction of Te in Te-Ge, y is the molar fraction of the total amount of Bi and Ga in the recording layer, and z is the molar fraction of Ga in Ga-Bi.

DESCRIPTION OF THE PREFERRED EMBODIMENTS

Figure 1:
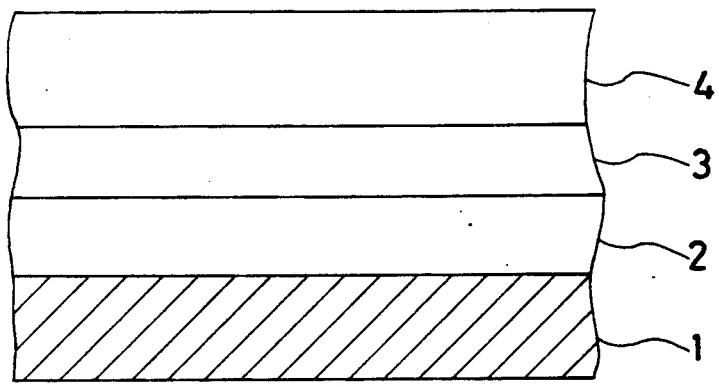
FIG. 1 is an enlarged cross-sectional view of the optical recording media of the present invention prepared in Examples 1 to 4.

The optical recording medium of the present invention comprises at least a substrate and a recording layer formed on the substrate, said recording layer being irradiated with an energy beam to change the optical properties thereof by directly or indirectly generated heat, thereby recording information, wherein said recording layer comprises four elements of tellurium (Te), germanium (Ge), gallium (Ga) and bismuth (Bi) and has a composition represented by the following formula:

wherein
0.40≦x≦0.75,
0.02≦y≦0.30 and
0.05≦z≦0.50,
x is the molar fraction of Te in Te-Ge, y is the molar fraction of the total amount of Bi and Ga in the recording layer, and z is the molar fraction of Ga in Bi-Ga.

In the present invention, the recording layer comprises a four-component system composed of Te-Ge and added thereto Bi and Ga. Mainly, Bi has the effect of uniformly and rapidly causing the crystallization during recording and Ga has the effect of improving the thermal stability of recorded information due to increasing the transition temperature of crystallization. Further, the four-component system having the above-described limited composition enables a portion corresponding to a beam profile of a laser pulse to be sufficiently and rapidly crystallized during recording to form a recorded mark. The crystallization of the recorded mark portion is uniform and free from coarsening of a crystalline grain around the periphery of the recorded mark, which makes it possible to realize the formation of a mark having a well controlled good shape. Further, since the transition temperature is sufficiently high and proper, crystallization by thermal conduction around the periphery of the recorded mark hardly occurs and therefore the unneeded increase of the size of the recorded mark can be suppressed and further the recording layer is less susceptible to crystallization during storage for a long period of time. By virtue of these effects, the recording medium of the present invention is less susceptible to an increase in the noise of medium during recording and excellent in CNR, jitter, sensitivity and recording characteristics even under high-density and/or high-speed recording conditions as well as in life of media.

In the present invention, the recording layer exhibits a large change of complex reflective index between the amorphous state and the crystalline state, so that the change of reflectance accompanying the phase transition, i.e., the amplitude of read-out signal, is large. Further, formation of a multi-layer structure comprising the recording layer in combination with a protective layer enables the amplitude of the read-out signal to be further increased by virtue of the optical interference effect.

In the above-described formula of the composition of the recording layer, when the amounts of Bi and/or Ga are small and outside the specified range, the unfavorable problems, such as an increase in the noise and/or a lowering in the CNR value, occur. On the other hand, when the amounts exceed the specified range, there occur problems that a proper crystallization temperature cannot be obtained and/or it is difficult to obtain excellent recording characteristics realized by the recording medium of the present invention.

When x is outside the specified range, no sufficient crystallization speed can be attained and/or it is difficult to uniformly crystallize the recording layer.

In order to more significantly develop the effect of the present invention, it is preferred that the values of x, y and z respectively fall within the following ranges:

$0.45 \leq x \leq 0.70$
$0.05 \leq y \leq 0.25$
$0.07 \leq z \leq 0.40$

There is no particular limitation on the thickness of the recording layer. However, for example, when the optical interference between two surfaces of the recording layer is utilized, the thickness may be set to 70 to 120 nm. Further, as will be described later, when other layers are provided adjacent to the recording layer to form, e.g., a stacked-layer structure of a substrate/recording layer/reflective layer, the same optical interference effect can be expected when the thickness of the recording layer is 10 to 70 nm.

Examples of the substrate used in the present invention include polymer resins such as polymethyl methacrylate resin, polycarbonate resin, epoxy resin, polyolefin resin, polyvinyl chloride resin, polyester resin and styrene resin, glass plates or metallic plates such as aluminum plate.

Although there is no particular limitation on the thickness of the substrate, it is preferably 0.01 to 5 mm from the practical point of view. The substrate may be flexible or rigid. The flexible substrate is suitable for use in the recording media in the form of a tape, a sheet or a card, while the rigid substrate is suitable for use in the recording media in the form of a disk or a card.

In the present invention, a reflective layer may be provided adjacent to both sides of the recording layer, preferably on the reverse side of the recording layer relative to an energy beam incident through the substrate (i.e., the side of the recording layer remote from the substrate).

In the present invention, the reflective layer mainly composed of Te, Bi and Ga are preferable. In particular, when the reflective layer has a composition represented by modifying the above-described formula in connection with the recording thin film, wherein Ge is completely removed and the amount of Te is one by subtracting the amount corresponding to the Ge content from the total content of Te, the distortion and stress between the reflective layer and the recording layer are relaxed, so that peeling and cracking can be suppressed.

In this case, even when constituent elements are diffused between the recording layer and the reflective layer, since Te, Bi and Ga are inherently constituent elements of the recording layer, it is possible to prevent or minimize the deterioration of the properties. Metals, such as Sb, Bi, Sn, Au, Al, Ti, Ni, Cr and Pb, or their alloys may be preferably used in the reflective layer. For example, Au and Al are also expected to exhibit a cooling effect, Ti and Cr have additionally a good blocking effect of diffusion, and Sb, Bi, Sn, Ni, Pb, etc. are useful for easily forming the reflective layer and providing sufficient optical reflectance.

Although there is no particular limitation on the thickness of the reflective layer, it is preferably 10 to 80 nm from the practical point of view. The reflective layer is expected to exhibit a function also as a cooling layer to increase in the quality of the recording through prevention of excessive crystallization due to thermal conduction around the periphery of the recorded mark.

In order to provide a recording medium capable of realizing high-density and high-speed recording at a practical laser power through the use of the recording medium of the present invention, a light absorption layer may be provided adjacent to the recording layer, preferably on the reverse side of the recording layer. A reduction of the thickness in the recording layer is a common practice to realize a clear mark shape through prevention of an increase in the mark size due to the thermal conduction during high-density recording. In this case, a mere reduction of the thickness in the recording layer brings about a lowering in the optical absorbance of the recording layer. This requires a large power for recording, so that the sensitivity unfavorably lowers. Even when the recording layer has a usual thickness, it becomes necessary for a similar large power to be used for recording in the case where the recording medium is in the form of a large size disk having a diameter of 200 cm or 300 cm and/or the disk is rotated at a high speed to realize high-speed recording for the purpose of improving the data transfer rate. Not only in the above cases but also in other cases, techniques for increasing the sensitivity are very important for realizing the recording at a practical power.

A major function of the light absorption layer is to generate heat through absorption of light not utilized in the recording layer and effectively hold the heat for indirectly heating the recording layer, thereby efficiently transferring the heat to the portion to be crystallized. There is no particular limitation on the thickness of the layers when the light absorption layer are provided. In this case, however, the thickness of the recording layer is preferably 20 to 70 nm, more preferably 40 to 60 nm from the viewpoint of obtaining a high contrast of read-out signal. The thickness of the light absorption layer is preferably 10 to 160 nm.

It is preferred that the coefficient of thermal diffusion, $\alpha$, and heat capacity, H, of the light absorption layer each at 25° C. respectively fall within the following ranges:

$0.003 \leq \alpha \leq 0.02$
$100 \leq H \leq 500$ wherein $\alpha = k/(c.p)$ wherein k is the thermal conductivity (kcal/m.hr.K), c is the specific heat (kcal/kg.K) and p is the density (kg/m$^3$); and H=c.p.

When the $\alpha$ value exceeds the above-described range, the generated heat rapidly diffuses within the light absorption layer, so that the heat is not sufficiently transferred to the recording layer. On the other hand, when the $\alpha$ value is smaller than the above-described range, the thermal diffusion is so slow that the recording layer is excessively heated. This unfavorably brings about an excessive increase in the mark size and makes the recording layer susceptible to thermal distortion. When the H value is smaller than the above-described range, the temperature of the light absorption layer is higher than that in the case of a larger H value at the same power. This makes the light absorption layer susceptible to thermal distortion, and in this case a lowering in the power for avoiding this trouble makes it impossible to store heat in an amount sufficient to heat the recording layer. On the other hand, when the H value is excessively large, it becomes difficult to raise the temperature of the light absorption layer, so that the recording layer cannot be effectively heated.

In the present invention, the light absorption layer comprises a metal having a capability of absorbing light at a wavelength of recording light, or a mixture of the light absorptive metal with a metal-oxide, metal-nitride, metal-carbide or metal chalcogenide compound. Tantalum nitride, $Bi_2Te_3$ and TePb are particularly preferred because they provide proper $\alpha$ and H values.

Further, in the present invention, in order to effectively develop the properties inherent in the recording medium, a protective layer may be provided between the substrate and the recording layer, on the reverse side of the recording layer or the surface of the recording medium, and a diffusion blocking layer may be provided between the recording layer and the reflective layer or between the recording layer and the light absorption layer.

The protective layer may be an inorganic thin film such as $SiO_2$, ZrC, ITO or ZnS thin film, or an UV curing resin thin film. These films may be formed by vacuum evaporation, sputtering, spin-coating, etc.

In the case of the inorganic thin film, $SiO_2$, ZrC, ZnS, $MgF_2$ or oxides, carbides and nitrides of metals such as Si, Al, Ti, Zr, Te, Ge, etc. and their compounds are preferred because of their excellent heat resistance, etc. In the case of the compound film, a compound film comprising ZrC and $SiO_2$, a compound film comprising ZnS and $SiO_2$, a compound film comprising TiC and $SiO_2$, a compound film comprising ZnS and $MgF_2$ or an SiAlON film (i.e., an inorganic film formed by making use of a target comprising Si, Al, 0 and N in a proportion of 5.5:0.5:0.5:7.5 and added thereto 7.5% by weight of $Y_2O_3$) are preferred because they prevent the distortion of the recording layer caused by write power to reduce the noise, imparts excellent CNR and recording characteristics and excellent moisture-and-heat resistance to the recording medium. Representative examples of the inorganic thin film include a compound film comprising ZrC and $SiO_2$ in a molar fraction of about 3:7, a compound film comprising TiC and $SiO_2$ in a molar fraction of about 4:6, a compound film comprising ZnS and $SiO_2$ in a molar fraction of about 8:2 and a compound film comprising ZnS and $MgF_2$ in a molar fraction of 85:15.

The diffusion blocking layer prevents the diffusion of elements between the recording layer and the reflective layer to suppress the deterioration of the properties, and may comprise the similar material as that of the protective layer.

The above-described protective layer and diffusion blocking layer may comprise at least one metal selected from among Zr, Ta, Ti and W, silicon, oxygen and carbon. In this case, the contents of the above-described metal, Si, O and C are preferably 3 to 40 atomic %, 5 to 30 atomic %, 5 to 70 atomic % and 3 to 40 atomic %. This constitution can prevent the deterioration of the film quality and performance of the recording layer and simultaneously enhance the adhesion to the recording layer.

An overcoat layer comprising an UV curing resin may be provided on the medium. Further, it is also possible to clad the medium with a resin such as an epoxy or polycarbonate resin, a film, a glass, etc., or other substrate by means of an adhesive.

The provision of the above-described protective layer, diffusion blocking layer and surface coat layer is expected to exhibit effects such as an improvement in the durability and resistance to moisture-and-heat, prevention of distortion of the recording layer such as peeling and protuberance of the recording layer from the protective coat and the substrate, and prevention of loss of the medium caused by melting, evaporation, diffusion, etc., and further effects such as an improvement in the cycleability in the case where the reversible change between the amorphous state and the crystalline state is utilized.

There is no particular limitation on the thickness of the above-described protective layer and diffusion blocking layer. However, for example, the thickness may be set as follows. When they are provided between the substrate and the recording layer, the thickness may be 0 to 300 nm from the viewpoint of a proper design of the optical reflectance and effects of durability and resistance to moisture-and-heat of the medium. The diffusion blocking layer may be as thin as 0 to 40 nm for the purpose of minimizing the influence on the optical interference of inserting this layer between the recording layer and reflective layer or light absorption layer. Alternatively, it may be 100 to 300 nm for the purpose of attaining a large change of reflectance accompanying the phase transition of the recording layer based on the optical interference of multilayer structure. The protective layer provided on the recording layer and the protective layer provided on the reflective layer or light absorption layer may have a thickness of 10 to 300 nm from the viewpoint of the optical interference, durability and resistance to moisture-and-heat.

The constitution, materials and film thickness described herein are those for specifically explaining the present invention, and it is a matter of course that the present invention is not limited to these only. Further, the protective layer, reflective layer, light absorption layer and diffusion blocking layer used in the present invention may be arbitrarily selected or combined depending upon the purposes and applications, and this enables an optimal stacked-layer structure to be selected without being limited to examples of the present invention.

The optical recording medium of the present invention can be formed by various methods. A magnetron sputtering will now be described as an example of the method.

At the outset, a glass having a size of 1.2 mm in thickness $\times$ 3 cm $\times$ 3 cm or a polycarbonate (hereinafter referred to as "PC") having a thickness of 1.2 mm and a diameter of 13 cm and provided with a spiral groove having a pitch of 1.6 $\mu$m was used as a substrate. The substrate was rotated within a vacuum chamber at 10 to 150 rpm for uniformity of the composition and thickness of the recording layer, protective layer, reflective layer, light absorption layer and diffusion blocking layer.

The vacuum chamber was evacuated to $1.5 \times 10^{-3}$ Pa, and an argon gas as a sputtering gas was introduced thereinto. Then, several tens to 1 kW of a RF output was applied to the target while maintaining the vacuum chamber at a degree of vacuum of 0.8 to 0.1 Pa, thereby carried out sputtering. The film thickness was determined by making use of a known thickness monitor used crystal oscillator.

The recording layer and the light absorption layer were formed by co-sputtering Bi, Ga, Te or their alloys and Te-Ge alloy to form a layer having a predetermined composition. $Bi_2Te_3$ alloy, TePb alloy, Te-Ga alloy and a four-element target (Te, Ge, Ga, Bi) prepared so as to provide a thin film having a predetermined composition were also used as the target. In this case, the control of the composition was carried out by varying the proportion of sputtering of $Te_{0.51}Ga_{0.09}Bi_{0.4}$ target and $Te_{0.5}Ge_{0.5}$ target in the co-sputtering thereof, or putting the $Bi_2Te_3$ alloy or Te-Ga alloy pellets having a thickness of 5 mm and a diameter of 20 mm on the erosion zone of the above-described targets. These methods are reproducible when the conditions are constant. The composition of the formed films was confirmed by the inductively coupled plasma atomic emission spectrometry.

The reflective layer was formed in the same manner as that used in the formation of the recording layer by making use of a target comprising Te, Bi, Ga or their alloys, or a metal such as Au, Sb, Sn, Bi, Pb, Al, Ti, Ni or Cr or their alloys.

$SiO_2$, ZrC, ZnS and TiC targets, a target comprising ZnS and $SiO_2$ in a molar fraction of 8:2 and a target comprising ZnS and $MgF_2$ in a molar fraction of 85:15 were used according to the purpose for the formation of the protective layer and the diffusion blocking layer. A compound thin film comprising a compound of the above-described targets was formed by co-sputtering. For example, in the co-sputtering of ZrC and $SiO_2$, the RF output to be applied to each target was adjusted while separately monitoring them by means of a thickness monitor used crystal oscillator, thus varying the amount of sputtering of each target and compounding them on the substrate.

It is a matter of course that the sputtering conditions vary depending upon apparatuses used, and it is needless to say that the optical recording medium of the present invention may be prepared under other condition than that described above. Further, it is needless to say that the optical recording medium of the present invention may be prepared by known vacuum thin film forming methods, e.g., vacuum evaporation, electron beam evaporation, ion plating and so forth.

The optical recording medium of the present invention are mainly evaluated by the following methods.

(1) Transition temperature

A pair of electrodes are provided on a recording layer formed on a glass substrate, and a resistance of 30 kΩ is connected to one end thereof in series. A constant voltage of 5 V was applied to both ends of the remaining electrode and resistance, and the voltage across both ends of the resistance is measured by means of a voltmeter. The voltage and current applied to the thin film are determined therefrom, and the resistance value is calculated. Then, in a heating oven, the resistance was measured while uniformly heating the whole substrate at a rate of about 10° C./min by means of a thermocontroller, and a temperature at which the resistance changes from a high value to a low value is determined as a transition temperature.

(2) Composition

The recording layer formed on a glass plate was dissolved in aqua regia, nitric acid or the like to separate it from the substrate. The resultant solution was analyzed by inductively coupled plasma (ICP) emission spectrochemical analyzer (Model SPS-1100 manufactured by Seiko Instruments Inc.) to determine the content of each element, and the percentage composition was calculated therefrom.

(3) Write/read characteristics

A recording layer was formed on a PC substrate provided with a groove. Evaluation was carried out by making use of an apparatus mainly composed of an optical head containing a laser diode having a wavelength of 830 nm, a disk rotating device and a control circuit therefor. The optical head is controlled in such a manner that it focuses a laser beam on the recording layer by means of an objective lens having a numerical aperture of 0.5 through the disk substrate being rotated and tracks the groove provided on the substrate.

The evaluation is carried out under conditions of a write power of 1 to 15 mW, a recording frequency of 0.2 to 6.25 MHz, a write signal duty of 10 to 90% and a linear velocity of 1.2 to 22 m/sec. The CNR was determined in terms of the difference between carrier signal and noise in a spectrum analyzer wherein the written signal was read out at a read power of 0.7 mW, and the bandwidth of the read-out signal was set to 30 kHz. The noise was determined by interpolation from the noise values at distances of ±0.3 MHz from the carrier frequency. The amplitude of the read-out signal was determined in terms of a peak-to-peak value by means of a known oscilloscope.

The present invention will now be described in more detail by way of the following Examples and Comparative Examples.

EXAMPLES 1 TO 4 AND COMPARATIVE EXAMPLE 1

Optical recording media having a stacked-layer structure of substrate 1/first protective layer 2/recording layer 3/second protective layer 4 as shown in FIG. 1 was prepared by the sputtering method described in the above-described process for preparation through the use of a glass substrate and a PC substrate. The substrates were rotated at 40 rpm for uniformity of the composition and film thickness.

An about 100 nm-thick $SiO_2$ layer as the first protective layer was formed on the substrate at a degree a vacuum of 0.5 Pa. Te, Ga, Bi and their alloys and $Te_{0.5}Ge_{0.5}$ alloy were co-sputtered thereon while monitoring them by means of a thickness monitor used crystal oscillator to form an about 95 nm-thick recording layer. Finally, a 120 to 150 nm-thick $SiO_2$ layer was formed as a second protective layer. In Examples 1 to 4 and Comparative Example 1, only the composition of the recording layer was varied. The compositions, transition temperatures and CNR values measured under high-density write conditions of a linear velocity of 5.5 m/sec and a recording frequency of 3.7 MHz are shown in Table 1.

All the optical recording media prepared in Examples 1 to 4 fulfilled the requirement (45 dB or more) specified in ISO under high-density writing conditions (mark pitch: 1.49 μm), i.e., had excellent write/read characteristics. By contrast, in Comparative Example 1, the CNR value was as low as 43 dB and did not fill the ISO standards. Thus, the optical recording media of the present invention exhibited excellent high-density recording characteristics even in the form of a simple three-layer structure (exclusive of the substrate) which is easy to produce and inexpensive. Further, in Examples 1 and 2, high-speed writing was carried out at a linear velocity of 11.5 m/sec and a recording frequency of 3.7 MHz. As a result, the CNR values in Examples 1 and 2 were 57 dB and 55 dB, respectively. That is, excellent write/read characteristics were obtained in the case of high-speed writing as well.

For the crystallization temperature having an effect on the life of the written signal, all the Examples exhibited a 20° C. or more improvement over 123° C. of Comparative Example 1. This substantiates that the long-term life of written signal has been remarkably improved in the present invention.

In all the Examples 1 to 4, an increase in the noise accompanying the writing was as small as several dB or less.

TABLE 1

|  | Ex. 1 | Ex. 2 | Ex. 3 | Ex. 4 | Comp. Ex. 1 |
| --- | --- | --- | --- | --- | --- |
| Composition (molar fraction) | | | | | |
| x | 0.55 | 0.56 | 0.61 | 0.53 | 0.6 |
| y | 0.09 | 0.11 | 0.09 | 0.1 | 0.12 |
| z | 0.22 | 0.18 | 0.4 | 0.11 | 0.0 |
| Transition temp. (°C.) | 170 | 148 | 155 | 145 | 123 |
| CNR (dB) | 47 | 46 | 45 | 47 | 43 |

Note: x, y and z are each a molar fraction and represent the composition of the following formula: $(Te_xGe_{1-x})_{1-y}(Ga_zBi_{1-z})_y$

EXAMPLE 5

$SiO_2$ and ZrC were co-sputtered on a PC substrate in the similar manner and condition as those of Example 1 to form a 100 nm-thick first protective layer having a composition in terms of molar fraction of 74:26. Then, a recording layer having a composition of $(Te_{0.55}Ge_{0.45})_{0.93}(Ga_{0.07}Bi_{0.93})_{0.07}$ for sample (a) and a recording layer having a composition of $(Te_{0.53}Ge_{0.47})_{0.94}(Ga_{0.2}Bi_{0.8})_{0.06}$ for sample (b) were each formed thereon in a thickness of 90 to 100 nm. Finally, an about 140 nm-thick second protective layer was formed on each recording layer in the same manner as that used in the formation of the first protective layer.

Writing was carried out under high-density writing conditions of a linear velocity of 5.5 m/sec and a recording frequency of 3.7 MHz, and then the written signal was read out. As a result, for sample (a), the CNR was 51 dB at a write power of 8 mW, and no significant increase in the noise was observed between before and after writing. For sample (b) as well, the CNR was as good as 47 dB at a write power of 8.5 mW.

EXAMPLE 6

Figure 2:
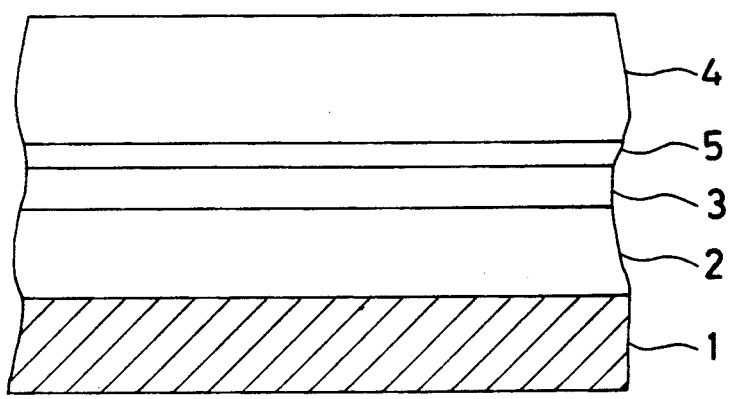
FIGS. 2 and 3 are enlarged cross-sectional views of the optical recording media of the present invention prepared in Example 6.
Figure 3:
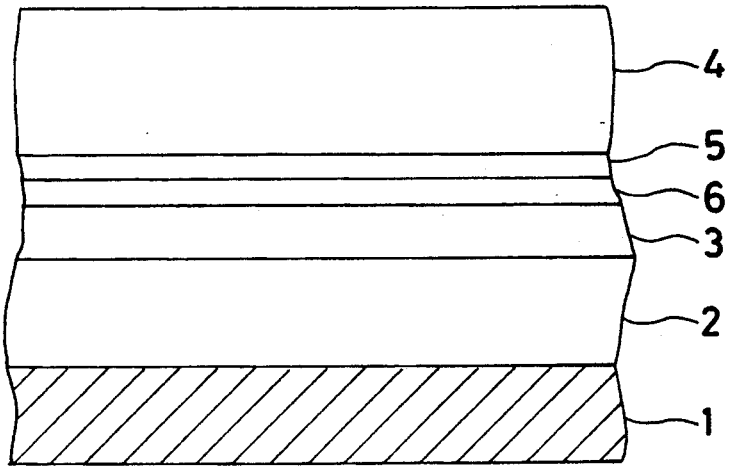

A 100 nm-thick first protective layer 2 of $SiO_2$ was formed on a PC substrate 1 in the similar manner and condition as those of Example 1. Then, for sample (a), an about 34 nm-thick recording layer 3 having a composition of $(Te_{0.55}Ge_{0.45})_{0.91}(Ga_{0.19}Bi_{0.81})_{0.09}$ was formed thereon, and an about 20 nm-thick reflective layer 5 having a composition of $Te_{0.51}Ga_{0.09}Bi_{0.4}$ was formed on the recording layer. For sample (b), an about 36 nm-thick recording layer 3 having a composition of $(Te_{0.56}Ge_{0.44})_{0.9}(Ga_{0.18}Bi_{0.82})_{0.1}$, an about 21 nm-thick $SiO_2$ diffusion blocking layer 6 having the same composition as that of the first protective layer 2 and an about 20 nm-thick reflective layer 5 having a composition of $Te_{0.51}Ga_{0.09}Bi_{0.4}$ were successively formed on the first protective layer. Finally, an about 150 nm-thick $SiO_2$ second protective layer 4 was formed on the reflective layer 5 of both samples (a) and (b). Thus, there were obtained sample (a) having a stacked-layer structure of substrate 1/first protective layer 2/recording layer 3/reflective layer 5/second protective layer 4 shown in FIG. 2 and sample (b) having a stacked-layer structure of substrate 1/first protective layer 2/recording layer 3/diffusion blocking layer 6/reflective layer 5/second protective layer 4 shown in FIG. 3.

Writing was carried out under high-density writing conditions of a linear velocity of 5.5 m/sec and a recording frequency of 3.7 MHz, and then the written signal was read out. As a result, both samples (a) and (b) exhibited a CNR value of 49 dB or more at a write power of 10 to 11 mW, i.e., excellent writing characteristics fulfilling the standards of ISO. The CNR value under high-speed writing conditions of a linear velocity of 11.5 m/sec, a recording frequency of 3.7 MHz and a write power of 10 to 12 mW was 55 dB for sample (a) and 59 dB for sample (b).

Further, the transition temperature of crystallization was measured. As a result, it has been found that both samples (a) and (b) had a transition temperature of crystallization over 150° C., i.e., about 30° C. above that of the recording medium prepared in Comparative Example 1.

EXAMPLE 7

Optical recording medium samples (a) to (i) having the same film thickness and stacked-layer structure as those of sample (b) prepared in Example 6 were prepared in the similar manner as that of Example 6, except that the reflective layers 5 comprised of Sb, Bi, Sn, Au, Al, Ti, Ni, Cr and Pb, respectively.

Writing for these optical recording media (a) to (i) was carried out under high-density writing conditions of a linear velocity of 5.5 m/sec and a recording frequency of 3.7 MHz. As a result, in all the samples, the CNR values exceeded the necessary value, i.e., were as good as 45 dB or more.

EXAMPLE 8

Thin films were stacked on a PC substrate in the similar manner as that of Example 1 by making use of the same sputtering apparatus as that used in Example 1. For sample (a), a target comprising a mixture of ZnS with $SiO_2$ was sputtered under a sputtering pressure of 0.25 Pa to form a 160 nm-thick first protective layer having a ZnS to $SiO_2$ molar fraction of 8:2. Then, a 95 nm-thick recording layer having a composition of $(Te_{0.56}Ge_{0.44})_{0.9}(Ga_{0.2}Bi_{0.8})_{0.1}$ was stacked thereon under a pressure of 0.37 Pa, and a 90 nm-thick second protective layer having the same composition as that of the first protective layer was stacked thereon under the same condition. Separately, for sample (b), a specimen having the same layer structure as that of sample (a) was formed in thicknesses of 220 nm/95 nm/250 nm in the similar manner as that used in sample (a), except that the first and second protective layers were formed by sputtering a compound target comprising ZnS and $MgF_2$ under a pressure of 0.17 Pa to form a layer having a composition comprising ZnS and $MgF_2$ in a molar fraction of 85:15. Finally, for both samples (a) and (b), a 0.01 mm-thick surface coat layer of an acrylic UV curing resin was formed on the second protective layer. Thus, there were obtained samples (a) and (b) each having a stacked-layer structure of substrate/first protective layer/recording layer/second protective layer/surface coat layer.

Writing was carried out under high-density writing conditions of a linear velocity of 7.42 m/sec, a recording frequency of 4.6 MHz and a write pulse duty of 50%.

For initial characteristics, samples (a) and (b) exhibited excellent recording characteristics. Specifically, sample (a) exhibited a CNR value of 49 dB at a write power of 6 mW, while sample (b) exhibited a CNR value of 49 dB at a write power of 8.6 mW. Then, both disks were allowed to stand for 610 hrs in an oven having an atmosphere of 80° C. and 80%RH, removed from the oven, and then subjected to determination of deterioration of read-out performance on the initially written portion by the moisture-and-heat resistance acceleration test. As a result, both samples (a) and (b) exhibited a CNR value of 50 dB, i.e., no lowering in the CNR value and had excellent life of written signal. Further, when writing was carried out under the above-described writing conditions in the unwritten portion of both samples (a) and (b), and the written signal was read out. As a result, the CNR values of samples (a) and (b) were 50 dB and 50.4 dB, respectively. That is, excellent recording characteristics equal to or superior to the initial characteristics were obtained after the moisture-and-heat test.

Further, evaluation of a sample equivalent to sample (a) was carried out under writing conditions of a linear velocity of 8 m/sec, a recording frequency of 5 MHz, a pulse width of 80 nsec and a write power of 14 mW. In this case, at the outset, the sample was allowed to stand in an atmosphere of 60° C. and 90% RH for 630 hrs and then evaluated. Thereafter, the sample was allowed to stand in an atmosphere of 70° C. and 80% RH for 370 hrs and evaluated again. As a result, the initial CNR was 49 dB, and the change of the initial written signal with time and the change of characteristics of writing into the unwritten portion after standing in moisture-and-heat conditions were each 1 dB or less in terms of the change of the CNR. Further, the sample exhibited no increase of noise. Example 9:

Writing was carried out by making use of a disk equivalent to sample (a) prepared in Example 8 under conditions of a linear velocity of 7.5 m/sec, a pulse width of 109 nsec and a write power of 8 to 10 mW with recording frequencies of 4.6 MHz, 2.3 HMz and 1.72 MHz. Pulses were reproduced from respective read-out signals by means of a peak detection circuit (detection of zero-cross after passing through a differential circuit), and the jitter in the rising of the reproduced pulse was measured by means of Model 5371 time interval analyzer manufactured by Hewlett-Packard. In a number of sample points of 10,000, the standard deviations, $\sigma$, were 3.9 ns, 3.3 ns and 3.6 ns, respectively. That is, the jitter values, $\sigma$, were sufficiently small from the viewpoint of the window width for detection, i.e., 72.5 ns, under the above-described writing conditions in a (2,7) code writing system as a position recording system of an optical disk.

EXAMPLE 10

A disk which is the same as that of Example 8 except for the first and second protective layers was prepared by making use of the same sputtering apparatus as that used in Example 8. For the formation of the first and second protective layers, the sputtering was carried out under the pressure of 0.44 Pa by making use of a mixed gas comprising Ar and $N_2$ in a molar fraction of 95:5, and a target comprising Si, Al, O and N in a proportion of 5.5:0.5:0.5:7.5 and added thereto 7.5% by weight of $Y_2O_3$ (hereinafter referred to as "SiAlON") was used to form a 100 nm-thick first protective layer and 110 nm-thick second protective layer. Writing was carried out under writing conditions of a linear velocity of 7.5 m/sec and a pulse width of 109 nsec with recording frequencies of 4.6 MHz and 1.72 MHz respectively corresponding to the shortest 1.5T and the longest 4T of (2,7) code by making use of the same evaluation apparatus as that described in the above measuring method (3), except that the recording wavelength and the numerical aperture of the optical system were 780 nm and 0.5, respectively. The write power and the read-out power were 8 to 10 mW and 1.3 mW, respectively. The amplitude of the read-out signal was 66.2 $mV_{p.p}$ at 1.5T and 132.4 $mV_{p.p}$ at 4T. That is, when the writing density was increased, the lowering in the amplitude was small and the amplitude ratio was as good as 0.5.

EXAMPLE 11

A specimen having a layer structure of $ZnS$-$SiO_2$ first protective layer/$(Te_{0.56}Ge_{0.44})_{0.9}(Ga_{0.18}Bi_{0.82})_{0.1}$ recording layer/$ZnS$-$SiO_2$ second protective layer was formed on a glass substrate having a size of 30 mm × 30 mm by making use of the same sputtering apparatus as that used in sample (a) of Example 8 in the similar manner as that used in the preparation of sample (a) in Example 8. The film thickness was 170 nm/95 nm/ 50 nm for sample (a) and 200 nm/95 nm/30 nm for sample (b).

The reflectance at a wavelength of 830 nm through the substrate was measured immediately after preparation of the medium and after standing in an oven of 280° C. for 2 min to crystallize the recording layer by making use of a spectrophotometer (model U-3410) manufactured by Hitachi, Ltd., and the change of the reflectance between both cases was determined. Sample (a) exhibited a 30.7% increase in the reflectance over an initial value of 17%, while sample (b) exhibited an 30% increase in the reflectance over an initial value of 16%. Thus, the optical recording medium of the present invention exhibits a large change of reflectance (signal margin) accompanying the phase change between the amorphous state and the crystalline state, so that the amplitude of the read-out signal can be large.

EXAMPLE 12

Sample (a) was prepared in the same manner as that of Example 8, except that the first and second protective layers respectively having thicknesses of 140 nm and 90 nm were formed by co-sputtering $SiO_2$ and ZrC so as to have a $SiO_2$ to ZrC molar fraction of 7:3 under a pressure of 0.38 Pa. Sample (b) was prepared in the same manner as that of Example 10.

Writing was carried out under high-density writing conditions of a linear velocity of 4.08 m/sec, a recording frequency of 2.58 MHz, a write pulse duty of 33% with varied write powers. As a result, for both samples (a) and (b), a CNR of 48 dB or more was obtained over a wide write power range from 6 mW to 11 mW. For the maximum CNR value, a CNR of 52 dB was obtained at a write power of 7.3 mW for sample (a) and at a write power of 8.6 mW for sample (b). Thus, according to the optical recording medium of the present invention, excellent recording characteristics can stably be realized over a wide write power range.

EXAMPLE 13

A 800 nm-thick film having a composition of $(Te_{0.54}Ge_{0.46})_{0.92}(Ga_{0.16}Bi_{0.84})_{0.08}$ was formed on a fluororesin sheet ("TEFLON") of DUPONT in the similar manner as that of Example 1. Thereafter, the formed recording layer in an amorphous state was scraped off and subjected to a differential scanning calorimetry (DSC) by making use of an apparatus (model DSC-50) manufactured by Shimadzu Corp. The measurement was carried out at temperature raising rates of 5° C./min, 10° C./min, 20° C./min and 40° C./min. The sample was used in an amount of 8 mg for each measurement.

The activation energy determined from the four measurements was as large as 2.1 eV. The transition temperature determined by DSC was, e.g., 172.2° C. for the temperature raising rate of 10° C./min and 184.1° C. for the temperature raising rate of 40° C./min. From these results, it is apparent that the transition temperature of the recording medium is much higher than the normal operating environment temperature and the thermal stability in an amorphous state as well is satisfactory.

EXAMPLE 14

A 92 nm-thick first protective layer, a 95 nm-thick recording layer and a 140 nm-thick second protective layer were stacked on a substrate in the similar manner, materials and constitution as those of Example 8, except that the first and second protective layers were formed by co-sputtering TiC and $SiO_2$ under a pressure of 0.38 Pa so as to have a TiC to $SiO_2$ molar fraction of 4:6, thereby preparing sample (a). Sample (b) was prepared by directly forming the same recording layer on a substrate as that of Example 8 so as to have a thickness of 40 nm without provision of the first protective layer and stacking thereon a 60 nm-thick alloy film having a composition of $Ni_{0.8}Cr_{0.2}$ as a reflective layer under a pressure of 0.28 Pa. For both samples, a 0.01 mm-thick layer of an acrylic UV curing resin was finally overcoated.

Writing was carried out under writing conditions of a linear velocity of 4.08 m/sec, a recording frequency of 2.58 MHz and a write pulse duty of 33%. As a result, both samples (a) and (b) exhibited a CNR value of 50 dB at a write power of 7.3 mW, i.e., excellent recording characteristics.

EXAMPLE 15 AND COMPARATIVE EXAMPLE 2

Figure 4:
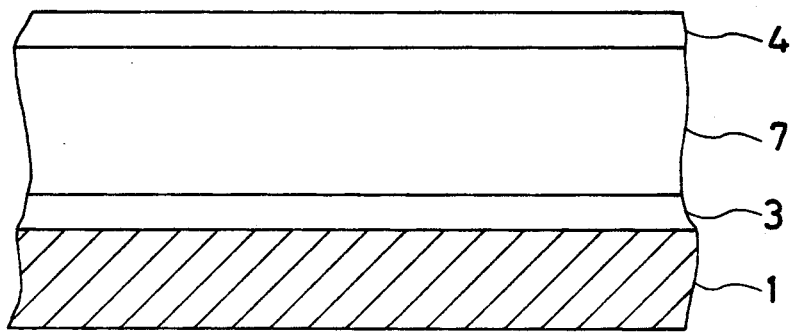
FIGS. 4 and 5 are enlarged cross-sectional views of the optical recording media of the present invention prepared in Example 15.
Figure 5:
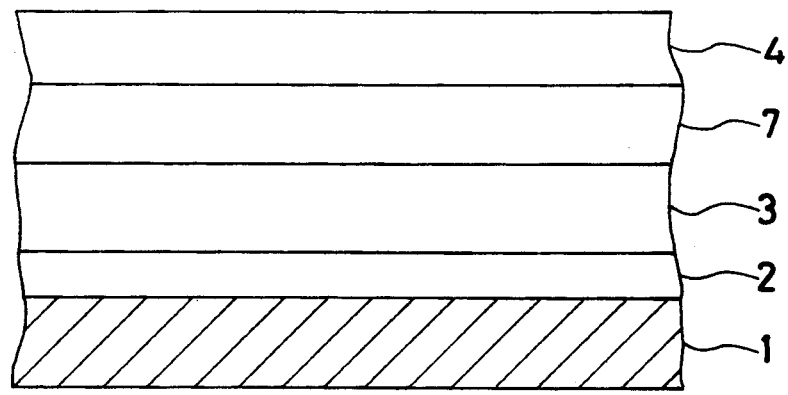

Sample (a) having a stacked-layer structure of substrate 1/recording layer 3/light absorption layer 7/second protective layer 4 shown in FIG. 4 and samples (b) and (c) each having a stacked-layer structure of substrate 1/first protective layer 2/recording layer 3/light absorption layer 7/second protective layer 4 shown in FIG. 5 were prepared by making use of the same sputtering apparatus and the similar method as those of Example 1 with a constant recording layer composition of $(Te_{0.56}Ge_{0.44})_{0.9}(Ga_{0.2}Bi_{0.8})_{0.1}$.

Specifically, sample (a) was prepared by directly stacking a 46 nm-thick recording layer 3 on a PC substrate 1 and stacking thereon as a light absorption layer 7 a 115 nm-thick $Bi_2Te_3$ film having a coefficient of thermal diffusion, $\alpha$, of 0.01 and a heat capacity, H, of 280. Sample (b) was prepared by stacking as a first protective layer 2 a 20 nm-thick film comprising ZnS and $SiO_2$ in a molar fraction of 8:2 and then stacking a 50 nm-thick recording layer 3 and a 50 nm-thick light absorption layer 7 by making use of the same materials and method as those used in sample (a). For both samples (a) and (b), a 50 nm-thick second protective layer 4 was stacked thereon by making use of the same materials and method as those used in the formation of the first protective layer 2. Sample (c) was prepared in the same manner as that used in sample (b), except that TePb having an $\alpha$ value of 0.006 and a H value of 340 was used as the light absorption layer 7. In Comparative Example 2, a 45 nm-thick first protective layer, a 50 nm-thick recording layer and a 110 nm-thick second protective layer were stacked on the substrate in the same manner as that used in sample (b), except that the light absorption layer 7 was not provided.

These samples was examined on the high-speed recording characteristics at a linear velocity of 22 m/sec and an improvement in the sensitivity attained by the light absorption layer. Writing was carried out under conditions of a frequency of 6.25 MHz, a write pulse duty of 50% and a write power of 1 to 15 mW. A write power at which the second harmonics of the read-out signal becomes minimum was regarded as the optimal write power. As a result, the optimal write powers of samples (a) to (c) were 12 mW, 13 mW and 13.5 mW, respectively, and they exhibited a CNR value of 60 dB. By contrast, in Comparative Example 2, since no light absorption layer was provided, the power was insufficient at 15 mW and 15 mW or more was necessary as the optimal write power although the CNR was 57 dB at 15 mW.

Thus, the optical recording medium of the present invention exhibits no lowering in the characteristics and excellent recording characteristics even in high speed recording at 22 m/sec. Further, provision of a light absorption layer remarkably improves the recording sensitivity and enables high-speed recording to be carried out at a practical semiconductor laser output.

The Examples were described for explaining excellent characteristics of the optical recording medium of the present invention by way of embodiments. It is needless to say that the present invention is not limited to these only. Further, it is also needless to say that other constitution and function effect than those of the above-described embodiments practiced according to the optical recording medium of the present invention and the gist of the present invention as well fall within the scope of the present invention.

What is claimed is:

1. An optical recording medium comprising at least a substrate and a recording layer formed on the substrate, said recording layer being irradiated with an energy beam to change the optical properties thereof by directly or indirectly generated heat, thereby recording information, wherein said recording layer comprises four elements of tellurium (Te), germanium (Ge), gallium (Ga) and bismuth (Bi) and has a composition represented by the following formula:

$$(Te_xGe_{1-x})_{1-y}(Ga_zBi_{1-z})_y$$

wherein
 $0.40 \leq x \leq 0.75$,
 $0.02 \leq y \leq 0.30$ and
 $0.05 \leq z \leq 0.50$,
 x is the molar fraction of Te in Te-Ge, y is the molar fraction of the total amount of Bi and Ga in the recording layer, and z is the molar fraction of Ga in Ga-Bi.

2. An optical recording medium according to claim 1, wherein the composition of said recording layer is represented by the following formula:

$$(Te_xGe_{1-x})_{1-y}(Ga_zBi_{1-z})_y$$

wherein
$0.45 \leq x \leq 0.70$,
$0.05 \leq y \leq 0.25$ and
$0.07 \leq z \leq 0.40$,
x is the molar fraction of Te in Te-Ge, y is the molar fraction of the total amount of Bi and Ga in the recording layer, and z is the molar fraction of Ga in Ga-Bi.

3. An optical recording medium according to claim 1 or 2, which further comprises a reflective layer provided on the side of the said recording layer remote from the said substrate.

4. An optical recording medium according to claim 3, wherein the said reflective layer is mainly composed of Te, Bi and Ga.

5. An optical recording medium according to claim 3, wherein the said reflective layer has a thickness of 10 to 80 nm.

6. An optical recording medium according to claim 1 or 2, which further comprises a light absorption layer provided on the side of said recording layer remote from the said substrate.

7. An optical recording medium according to claim 6, wherein the said light absorption layer has a thickness of 10 to 160 nm.

8. An optical recording medium according to claim 6, wherein the said light absorption layer has a coefficient of thermal diffusion, $\alpha$, and a heat capacity, H, each at 25° C. respectively falling within the following ranges:
$0.003 \leq \alpha \leq 0.02$
$100 \leq H \leq 500$ wherein $\alpha = k/(c.p)$ wherein k is the thermal conductivity (kcal/m.hr.K), c is the specific heat (kcal/kg.K) and p is the density (kg/m$^3$); and H=c.p.

9. An optical recording medium according to claim 6, wherein the said light absorption layer comprises a member selected from the group consisting of Ta nitride, $Bi_2Te_3$ and TePb.

10. An optical recording medium according to claim 1 or 2, which further comprises a protective layer between the said substrate and the said recording layer and/or on the side of said recording layer remote from the said substrate.

11. An optical recording medium according to claim 10, wherein the said protective layer comprises an inorganic film selected from the group consisting of films of ZnS and $MgF_2$, or oxides, carbides and nitrides of Si, Al, Ti, Zr, Te and Ge, and a mixture of said sulfides, fluorides, oxides, carbides and nitride.

12. An optical recording medium according to claim 10, wherein the said protective layer comprises an inorganic film selected from the group consisting of a compound film comprising ZrC and $SiO_2$, a compound film comprising ZnS and $SiO_2$, a compound film comprising TiC and $SiO_2$, a compound film comprising ZnS and $MgF_2$ and an SiAlON film.

13. An optical recording medium according to claim 3, which further comprises a diffusion blocking layer provided between the said recording layer and the said reflective layer.

14. An optical recording medium according to claim 6, which further comprises a diffusion blocking layer provided between the said recording layer and the said light absorption layer.

15. An optical recording medium according to claim 1 or 2, which further comprises a surface coat layer provided on the surface of the said optical recording medium.

16. An optical recording medium according to claim 10, wherein the said protective layer comprises an inorganic film selected from the group consisting of films of $SiO_2$ and ZrC.

* * * * *